United States Patent [19]

Reiker

[11] Patent Number: 5,909,006
[45] Date of Patent: Jun. 1, 1999

[54] ELECTRICAL BOX WITH SUPPLEMENTAL SUPPORT FOR CARRYING FIXTURES

[76] Inventor: Kenneth H. Reiker, 269 Country Club Dr., Shalimar, Fla. 32579

[21] Appl. No.: 08/862,378

[22] Filed: May 23, 1997

Related U.S. Application Data

[63] Continuation-in-part of application No. 08/490,757, Jun. 15, 1995, Pat. No. 5,677,512, which is a continuation-in-part of application No. 08/371,695, Jan. 12, 1995
[60] Provisional application No. 60/023,060, Aug. 2, 1996, and provisional application No. 60/018,227, May 24, 1996.

[51] Int. Cl.$^6$ ....................................................... H02B 1/30
[52] U.S. Cl. .............................. 174/62; 220/3.3; 220/3.9; 248/906; 248/205.3
[58] Field of Search ................................. 174/51, 58, 61, 174/62, 48, 53, 57; 220/3.2, 3.3, 3.8, 3.9, 3.92, 3.94, 4.02; 248/906, 205.3

[56] References Cited

U.S. PATENT DOCUMENTS

| | | |
|---|---|---|
| Re. 34,603 | 5/1994 | Caison et al. . |
| 1,004,946 | 10/1911 | Wares et al. ........................ 220/3.8 X |
| 1,798,838 | 3/1931 | Garvin ................................ 248/906 X |
| 3,616,096 | 10/1971 | Roeder . |
| 4,176,758 | 12/1979 | Glick . |
| 4,275,862 | 6/1981 | Takagi et al. . |
| 4,331,832 | 5/1982 | Curtis et al. . |
| 4,684,092 | 8/1987 | Reiker . |
| 4,909,405 | 3/1990 | Kerr, Jr. ................................... 220/3.9 |
| 5,303,894 | 4/1994 | Deschamps et al. ............... 248/906 X |
| 5,435,514 | 7/1995 | Kerr, Jr. . |

FOREIGN PATENT DOCUMENTS

| | | |
|---|---|---|
| 2436518 | 4/1980 | France . |
| 1309950 | 3/1973 | United Kingdom . |

Primary Examiner—Dean A. Reichard
Attorney, Agent, or Firm—Shlesinger, Arkwright & Garvey LLP

[57] ABSTRACT

An electrical junction box or mounting assembly includes a box having a top wall and a side wall. The side wall extends downwardly away from the top wall and defines a cavity therein. A supplemental fixture support is disposed in the cavity. A dimple is provided in the top wall, and the supplemental fixture support engages the dimple. A threaded hole may be provided on the supplemental fixture support. The supplemental fixture support may be a rivet. Preferably, the supplemental fixture support is sufficiently smooth for preventing wear to plastic-coated electrical wire which engages exposed surfaces of the fixture support.

39 Claims, 4 Drawing Sheets

ELECTRICAL BOX WITH SUPPLEMENTAL SUPPORT FOR CARRYING FIXTURES

CROSS-REFERENCE TO RELATED APPLICATIONS

This application claims the priority of Application No. 60/023,060, filed Aug. 2, 1996, and this application claims the priority of Application No. 60/018,227, filed May 24, 1996, and this application is a continuation-in-part of application Ser. No. 08/490,757, filed Jun. 15, 1995 (and now U.S. Pat. No. 5,677,512), and which application Ser. No. 08/490,757 is a continuation-in-part of application Ser. No. 08/371,695, filed Jan. 12, 1995, and each of which is incorporated herein by reference.

This application relates to application Ser. No. 08/862,379 filed May 23, 1997, entitled "Electrical Box with Cutout and Support for Carrying Fixtures", and application Ser. No. 08/862,380, filed May 23, 1997, entitled "Electrical Box with Auxiliary Supports for Carrying Fixtures", and each of which related applications is incorporated herein by reference.

FIELD OF THE INVENTION

The present invention relates to electrical boxes and methods of producing the same.

BACKGROUND OF THE INVENTION

Consumers, updated National Electrical Codes (NEC), and Underwriter Laboratories (UL) requirements all require that electrical boxes be made stronger than in the prior art.

OBJECTS AND SUMMARY OF THE INVENTION

An object of the invention is to overcome the drawbacks of known electrical boxes.

A further object of the invention includes making electrical boxes which use the standard punched-out, stamped electrical boxes in a more intelligent fashion.

Yet another object of the invention is to take out the radius of a standard industry size electrical box so that a support screw for supporting a fixture can be located the proper distance from a second support screw to meet National Electrical Code (NEC) standard.

Another object of the invention is to eliminate the problem of the upper radius of between the top wall and side wall of electrical boxes that prevents support studs for supporting fixtures from being fitted next to the inside face of such side wall.

Another object of the invention is to achieve a strengthened electrical box with a supplemental support within a standard so-called "4×4" box, while maintaining the near universal 3.5 inch (8.9 cm) spacing between the fixture supports so that the box is usable with standard light fixtures, ceiling fans, and the like.

It is likewise an object of the invention to provide supplemental metal inserts in the electrical boxes to enhance the carrying strength of the electrical boxes.

A further object of the invention is to provide studs in the electrical boxes that strengthen the electrical boxes.

Yet another object of the invention is to provide studs in the electrical boxes which cover the threads of standard screws so that, no screw threads are present in the interior of such electrical boxes.

A still further object of the invention is to provide an electrical box having a supplemental support with a sufficiently smooth exterior for preventing wear to the plastic coating of plastic-coated electrical wire.

It is yet another object of the invention to provide electrical boxes in which added supports, such as studs, are added during the manufacturing process to eliminate problems in prior art electrical boxes, as well as to strengthen the inventive electrical boxes.

Another object of the invention is to provide a junction box having a supplemental support, yet which requires no welding during assembly thereof.

Yet another object of the invention is to provide a electrical box having components which are easily fabricated, added to the electrical box, and assembled in the final form by the operation of screwing or riveting, yet which do not loosen when subjected to static and/or dynamic loading.

A still further object of the invention is to provide a junction box in which the supplemental support for carrying static and dynamic loads automatically engages the side walls of the junction box during assembly and/or in use thanks to the use of cutouts in the top wall thereof and/or thanks to the auxiliary support being configured for engaging the side wall thereof when the auxiliary support is attached and located in its attached, final form ready for use.

A still further object of the invention is to provide a junction box in which the supplemental support for carrying static and dynamic loads automatically engages the side walls of the junction box during assembly thanks to the use of dimpling in the top wall thereof and thanks to the supplemental support being configured for engaging the side wall thereof when the auxiliary support is attached and located in its attached, final form ready for use.

A still further object of the invention is to provide a junction box capable of carrying static and/or dynamic loads having an auxiliary support and that is assembled with fewer parts and with fewer steps than known devices.

It is a yet further object that all the above be carried out with an electrical box which carries the load of supported static and dynamic fixtures better than known electrical boxes.

In summary, the present invention is directed to an electrical junction box or mounting assembly which includes a box having a top wall and a side wall. The side wall extends downwardly away from the top wall and defines a cavity therein. A supplemental fixture support is disposed in the cavity. A dimple is provided in the top wall, and the supplemental fixture support abuts the dimple. A threaded hole may be provided on the supplemental fixture support. The supplemental fixture support may be a rivet. Preferably, the supplemental fixture support is sufficiently smooth for preventing wear to plastic-coated electrical wire which engages exposed surfaces of the fixture support.

These objects and advantages as well as others will be readily apparent from a review of the following description and drawings.

The drawings show a variety of embodiments of the invention, as will be clear from reading the description below.

It is important to note that the use of relative terms such as "up" and "down", and "left" and "right" is for convenience only and is not intended to be limiting.

DESCRIPTION OF THE PRIOR ART

Figure 1:
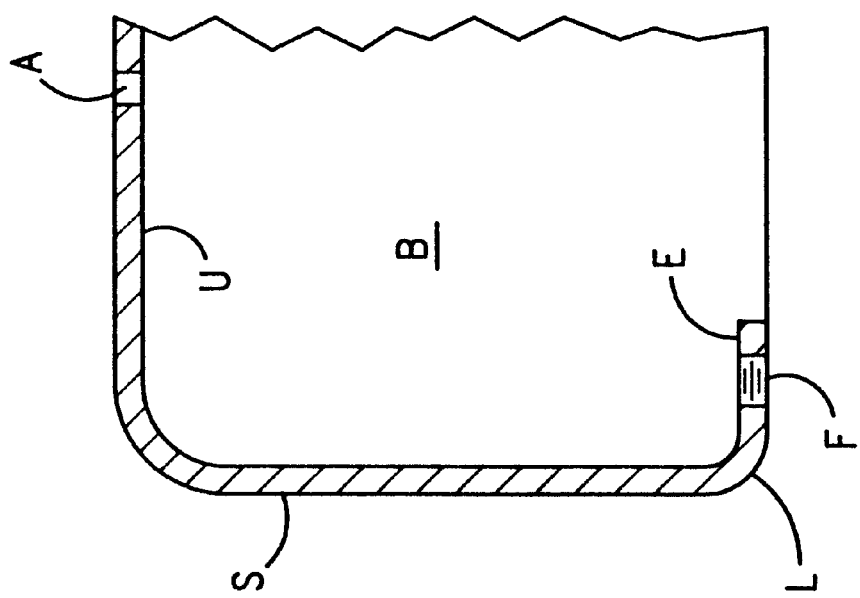
FIG. 1 is a cross sectional view of a PRIOR ART electrical junction box having an inwardly extending ear E with a faceplace plate attachment hole F provided therein.
Figure 2:
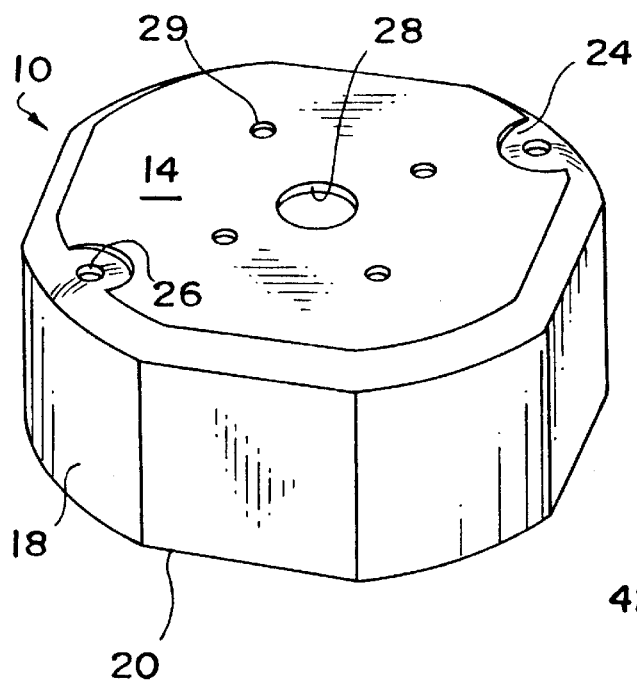
FIG. 2 is a top perspective view of a preferred embodiment of an electrical junction box according to the invention having dimples in a top wall thereof; prior to addition of a supplemental support.

FIG. 1 shows a PRIOR ART junction box including a side wall S, an upper wall U, and an ear E extending from a lower portion L thereof.

Upper wall U has one or more attachment holes A through which fasteners will be inserted for attaching PRIOR ART electrical box B to an overhead surface, such as to a ceiling joist or piece of plywood extending therebetween.

A lower, faceplate attachment hole F is typically provided in inwardly extending ear E. Frequently, faceplate hole F is provided with threads for mating with respective faceplate fasteners when securing an unillustrated faceplate thereto. Such faceplates are used to enclose electrical box B after the wiring inside the electrical box/junction box B has been completed.

A drawback of such PRIOR ART electrical boxes E is that they are typically made with stamped sheet metal extensions E; consequently, extensions E are relatively thin (i.e., in the order of about 1 millimeter or less). Such extension or ear E has a width of only a few millimeters, and only extends several millimeters inside box B. Thus, the surface area of ear E, when viewed from below after installation of upper wall U against a typical horizontal ceiling, is often substantially less than one centimeter squared (1 cm$^2$).

Consequently, ear E may only carry relatively small vertical loads, when installed against the ceiling, as described above.

As a result, local codes frequently allow such PRIOR ART boxes B to be used only for supporting the weight of a faceplate, or of a relatively light static load, such as a small light fixture.

Such electrical boxes B are unsuited for supporting large static loads, as well as for supporting large dynamic loads, such as ceiling fans which may weigh twenty-five kilograms or more (25 kg).

Thus, there is a need for an electrical box which is suited for carrying relatively large static loads as well as dynamic loads.

That need is especially clear, given that many homeowners want to install heavier light fixtures and dynamic loads, such as ceiling fans, than had exhibited such preferences in the past.

Furthermore, even if the initial owner/builder of a house or commercial space provides PRIOR ART load-carrying junction boxes B suited for carrying the vertical force of a small light fixture, a subsequent owner/user will often replace the original light fixture with a heavier light fixture, or with a dynamic load; i.e. a ceiling fan.

Accordingly, there is a need for a load-carrying junction box which is suited for a wide range of static and dynamic loads and, thus, suited for original installation in new construction, given that some users fail to upgrade load-carrying junction boxes when adding heavier static and/or dynamic loads to the box.

The electrical box according to the invention has overcome these drawbacks described immediately above, and has achieved the objects of the invention detailed above. Such will be evident when reading the following detailed description of the invention.

DETAILED DESCRIPTION OF THE INVENTION

Turning to FIGS. 2–5, a first preferred embodiment of an electrical box and/or junction box 10 according to the invention will now be described in detail.

Junction box 10 includes a top wall 14, and a side wall 18 extending downwardly therefrom and defining a cavity therein. Side wall 18 includes a lower free edge 20.

Preferably, one or more dimples 24 are provided on top wall 14, for example. Typically, at least one hole 26 will be provided in the dimpled region for receiving a fastener therethrough. A lower face 27 of dimple 24 assists in positioning of a supplemental fixture support 30, as described in detail below.

Additional holes, such as a hole 28, for receiving portions of an electrical fixture or wiring, for example, and/or holes 29 for receiving fasteners which secure junction box 10 to a ceiling, for example, are typically provided.

Supplemental support 30 may be provided for increasing the holding strength of junction box 10.

Supplemental support 30 may be made with a height substantially equal to the distance between lower free edge 20 and lower face 44 of top wall 14.

Further, supplemental support 30 may have an inside or right side 31, a threaded hole 32, an upper portion 36, and a lower portion 38, each of which is described in detail below.

Figure 5:
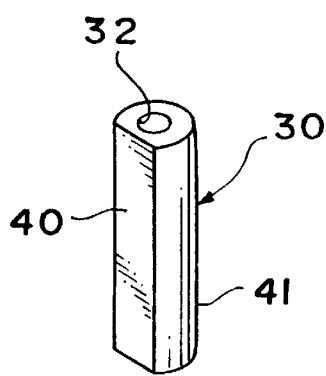
FIG. 5 is a top perspective view of a supplemental support for use with the embodiment of FIG. 2.
Figure 3:
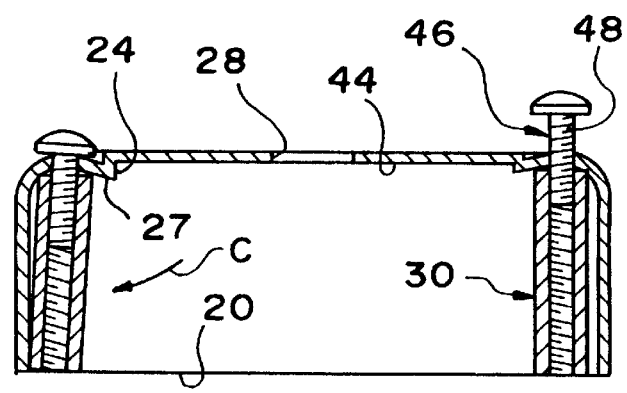
FIG. 3 is a cross-sectional view of the preferred embodiment of FIG. 2 showing the use of fasteners to secure supplemental supports to the junction box.

When increased resistance to inadvertent turning of supplemental support 30 about the longitudinal axis of fastener 46 is desired, supplemental support 30 may be provided with a face 40 configured for engaging with a portion of side wall 18 for restricting rotation of supplemental support 30. As shown in FIG. 5, configured face 40 may be made as a flat face. The nonconfigured exterior face of supplemental support 40 may be made as a rounded face 41, as shown.

Good results have been achieved when a threaded hole 32 is provided extending at least partially through supplemental support 30. Preferably, threaded hole 32 has threads selected to mate with those of fasteners 46.

Figure 4:
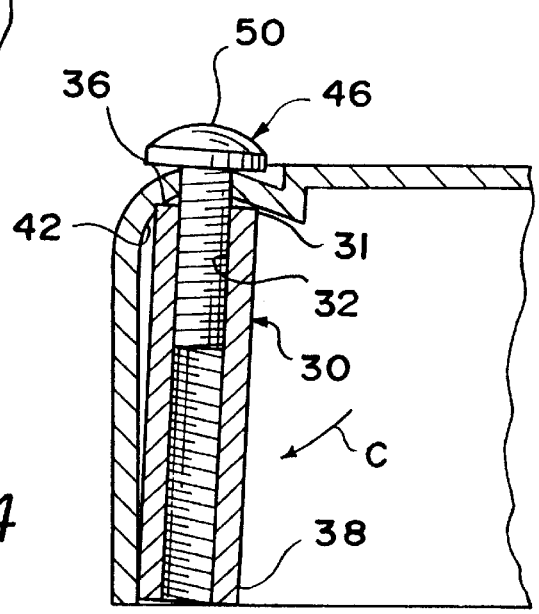
FIG. 4 illustrates a dimple of the embodiment of FIG. 2, by showing a portion of FIG. 3 on an enlarged scale.

Supplemental support 30 may be attached to box 10 by use of a powered screwdriver driving (i.e., turning) fastener 46 into threaded hole 32 by use of a screwhead 50. The threads of threaded hole 32 may extend all the way through support 30, as shown in FIG. 4, for example, so that an additional, unillustrated fastener for attaching a light fixture or ceiling fan, for example, may be attached to supplemental support 30 and, hence, to electrical box 10, from below during use.

It is likewise contemplated that threads 32 will be provided at the top portion of support 30, or at the bottom portion of support 30, or at both top and bottom portions with an unthreaded region in between.

Still further, it is expected that the threads 32 for mating with fastener 46 may be of a different size than the threads provided for mating with the fasteners which attach the ceiling fan or light fixture to the lower portion of support 30 when in use.

Support 30 may have a variety of external configurations as well, such as being a full, cylindrical shape with no flat face 40, a hexagonal supplemental support 30, a triangular supplemental support 30, and other configurations which achieve the objects of the invention.

Good results have been achieved when an upper portion 36 of supplemental support 30 engages lower face 27 of dimple 24. In that manner, support 30 may be located substantially adjacent to sidewall 18, so that sidewall 18 also assists in prevention of further outward movement of support 30 that might lead to a loosening of the connection between fastener 46 and top wall 14, and undesirable loosening of the support 30 relative to box 10.

Specifically, upper portion 36 of support 30 abuts lower face 27 of dimple 24 during assembly of box 10. When fastener 46 is tightened and draws support 30 into engagement with lower face 27, the right side or inside 31 of upper portion 36 contacts lower face 27 and causes support 30 to rotate in the direction of arrow C; i.e., clockwise, as viewed in FIGS. 3 and 4, for example so that the lower portion 48 of support 30 engages side wall 18. Thanks to the dimpled region 24, the lower portion 38 moves toward wall 18, rather than away from wall 18 as would happen if no dimpling were present and upper portion 30 contacted radiused region 42, as in a conventional electrical box.

When two supports 30 are attached to the left and right ones of holes 26, placement of support 30 yields the added benefit of achieving a standard center-to-center spacing between respective threads 32 of each of the two supported supports, even when using a "standard" box forming equipment for making a standard box size, as discussed in greater detail below. Such also has the benefit of allowing use of standard equipment for forming holes in a sheetrock ceiling for receiving the box, while maintaining the standard 3.5 inch fixture support.

It will be appreciated that the preferred embodiment of FIGS. 2–5 yields a solution to the problems set forth in the previous pages. For large-scale production, a powered screwdriver can be used to assist in this major breakthrough by attaching support 30 to the wall of the electrical box 10.

Figure 6:
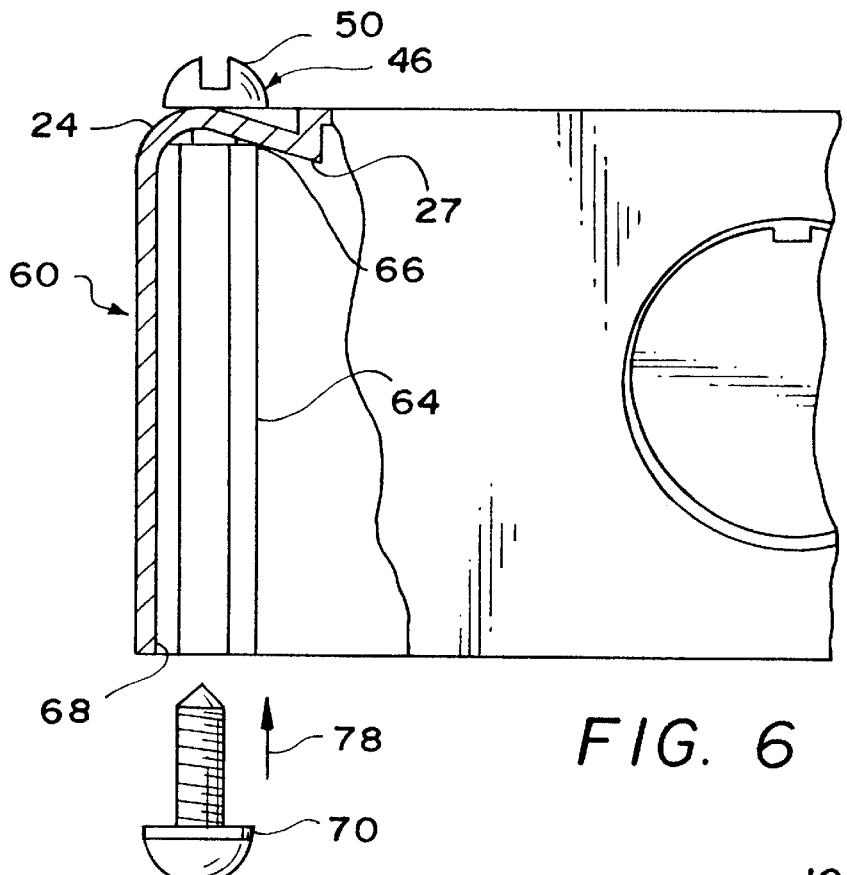
FIG. 6 is a cross-sectional view of another preferred embodiment of a junction box according to the invention.

FIG. 6 illustrates a yet still further preferred embodiment of a junction box 60 that allows a support 64 to be installed in the radius of the box by stamping or dimpling a portion of the steel box, i.e., providing dimple 24 as described above. In that manner, a lower portion 68 of the support stud 64 abuts the lower inside face of box 60.

During assembly of the embodiment of FIG. 6, support 64 is inserted through a hole in top wall 14, then support 64 is attached to top wall 14 by use of a hand-operated or automatic screwdriver by use of head 50. Such tightening of support 64 causes the tight: engagement of lower face 27 of top wall 14 and upper portion 66 of support 64, and, hence pushes lower portion 68 against the inside of box 60.

In use, a fastener or screw 70, typically provided with the ceiling fixture, is attached to and supported by junction box 60 by use of screws 70 attached to female threads and inserted in the direction of an arrow 78.

Figure 7:
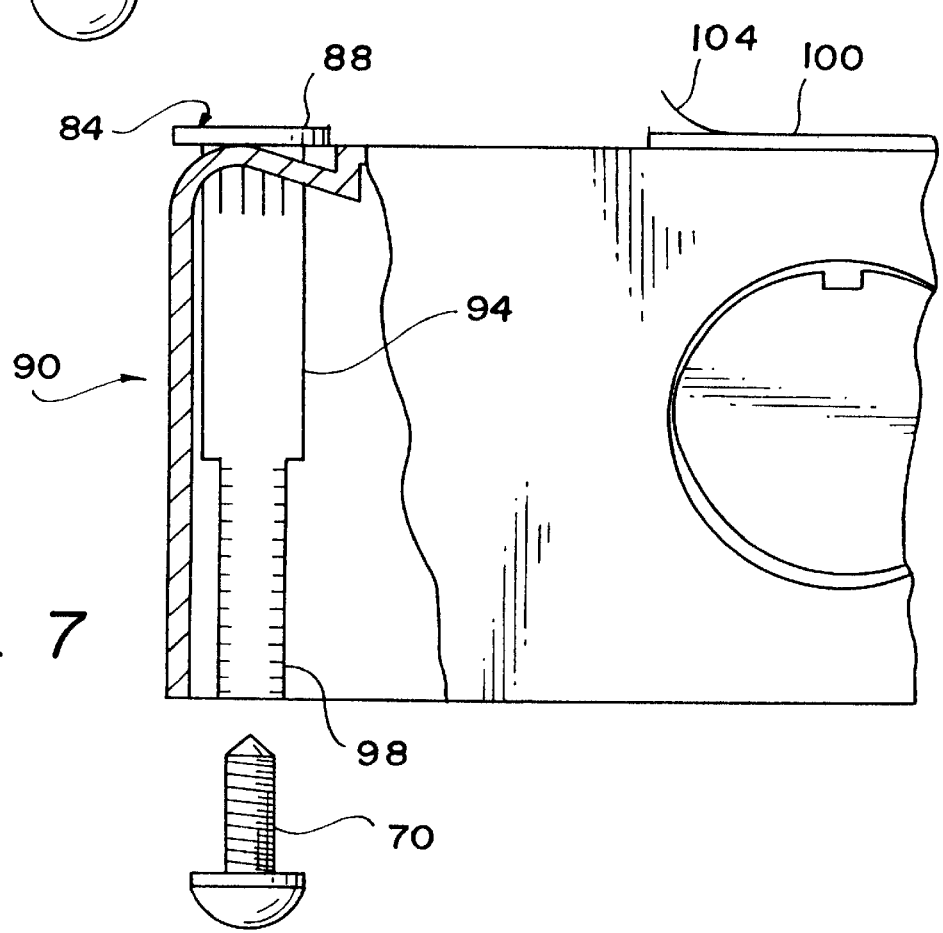
FIG. 7 is a cross-sectional view, similar to FIG. 6, of a still further preferred embodiment of a junction box according to the invention that has a supplemental support.

FIG. 7 shows another preferred embodiment of a junction box 90 according to the invention.

Box 90 has a support 84 with an upper portion 94 and a stepped-down portion 98 at a lower portion thereof. Stepped-down portion 98 provides for even more room in junction box 90 for wires and the like to be located. As in the other embodiments, female threads may be provided on stepped-down portion 98. Support 94 is pressure fitted onto box 90, and engagement of flange 88 of stud 84 with the upper face of dimpled portion 24 ensures that stud 84 maintains desired spacing with or moves into engagement with sidewall 18; i.e., moves into the desired position.

Junction box 90 includes a piece of double-sided tape 100 on top wall 14 thereof. Double-sided tape 100 may be provided with a protective strip or layer 104 on the outer face thereof, i.e., on the face of double-sided tape 100 that has not been adhered to junction box 90. Conventional double-sided tape 100 may be used.

Alternative means for adhering junction box 90 to a surface may be used, such as spray-on adhesive, a piece of putty and other adhering means, such as described in my earlier U.S. patent application Ser. No. 08/490,757, filed Jun. 15, 1995, and Ser. No. 08/371,695, filed Jan. 12, 1995, each of which is incorporated herein by reference, may be utilized in conjunction with or instead of the double-sided tape 100.

One of the many advantages of junction box 90 is that the user may remove protective layer 104, and then adhere double-sided tape 100 to the surface to which junction box 90 is to be attached. Double-sided tape is selected and sized so that sufficient holding power for temporarily adhering junction box 90 to the surface is achieved, while the user has both hands free for permanently attaching junction box 90 in the desired location by nails (or shooting screws) through one or more holes 29 in the top wall 14.

Preferably, the adhesive is sufficiently strong to adhere box 90 to a horizontal surface located above the user's head.

The thickness of double-sided tape 104 is coordinated with the thickness (i.e., height) of flange 84 of stud 84 so that each performs its intended function.

In a like manner, the height of the external portion of other illustrated supplemental supports will be coordinated with the thickness of adhesive material or double-sided tape 100. Specifically, when screw 46 and screwhead 54 of the embodiment of FIG. 6 are used with junction box 90, the thickness of double-sided tape 100 must be selected to be at least as high, and preferably in most cases, higher than the height of screwhead 50.

Alternatively, when attaching box 90 to a stud or ceiling joist having a width less than distance between left and right flanges 88, double-sided tape 100 need not extend away from top wall 14 a distance greater than the height of flanges 88. That is because the stud or joist would fit in between the offset left and right flanges 88.

Figure 8:
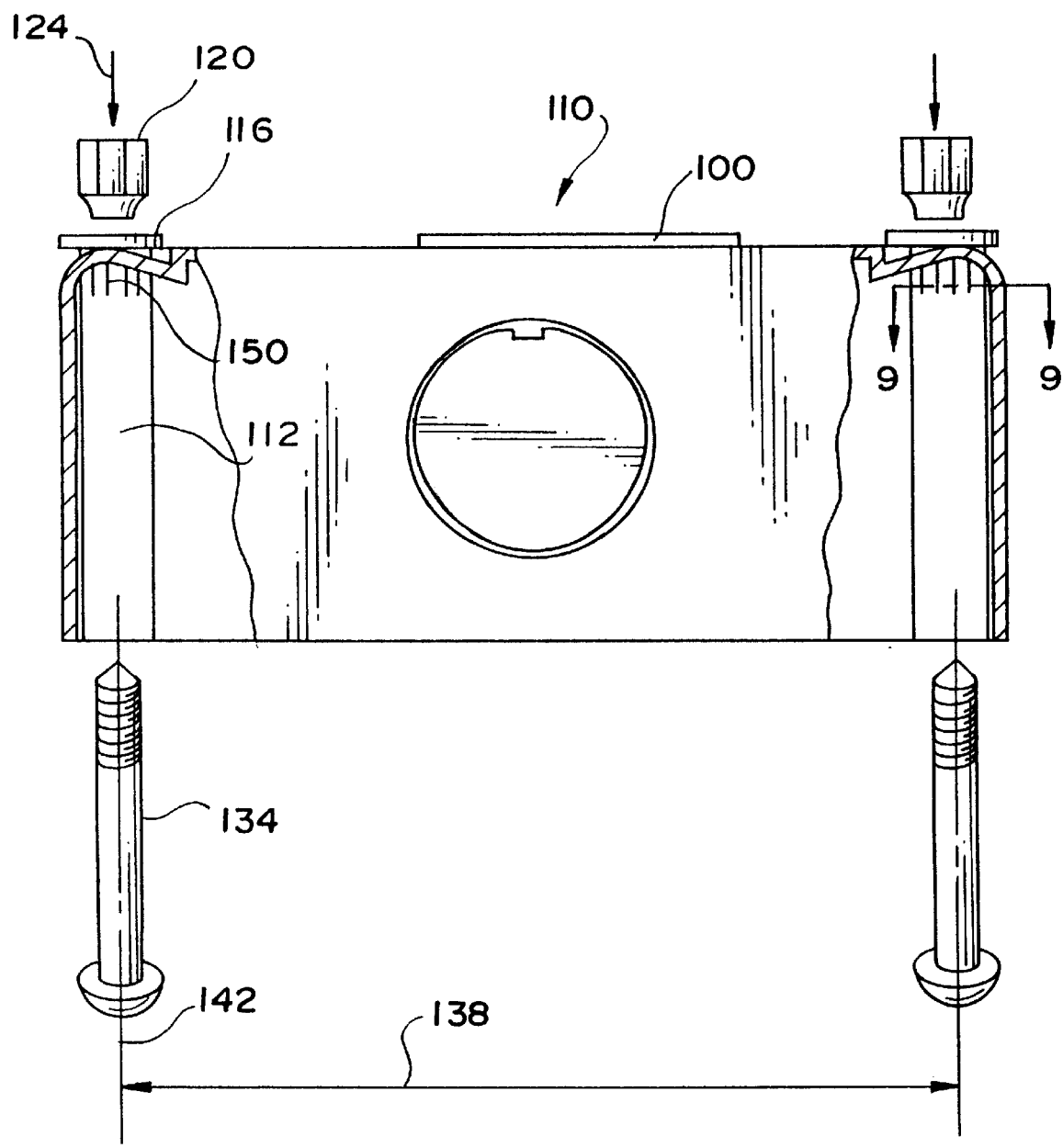
FIG. 8 is a cross-sectional view of yet another preferred embodiment of the invention, having a piece of double-sided tape on the top wall thereof for easing installation thereof.

The preferred embodiment of a junction box 110 illustrated in FIG. 8 includes a top wall 14 having dimples 24.

Any of the above-described supplemental supports, such as the illustrated support 84 or equivalents, may be used with junction box 110.

Flanges 116, and flanges 88 of the FIG. 8 embodiment, are particularly suited for restricting rocking movements of studs 94 and 112, respectively; i.e., restricting movement of supports 94 and 112 within a vertical plane defined by the two (2) illustrated studs of FIG. 8. One may consider a function of flanges 116 (and 88) to include serving as built-in washers for strengthening the connection between the supports and top wall 14 of the respective junction boxes 90 and 110.

It will be appreciated that restricting the tendency of the supports to move within a vertical plane helps maintain the integrity of the initial connection between the supports and junction boxes 90 and 110; e.g., the connection between top walls 14 and the supplemental supports.

Still further, restricting such tendency of the supports to rotate within a vertical plane helps to ensure that supports 94 and 112 extend substantially parallel to side wall 18 of their junction boxes 90 and 110 before and during use. Needless to say, all those aspects of fine-tuning of the connection between the supplemental support and the remainder of the junction box are geared for achieving predictability of where the lower threaded portions of the supports are.

Needless to say, the disclosed connections and configurations act to restrict all movements between supports 94 and 112 and the remainder of the respective boxes 90 and 110. The above discussion regarding restriction of movement within a "vertical" plane is merely an example.

By restricting movement of the supplemental supports, there is achieved the desired predictability of where the lower portions of female threads on 98 and 112 are located so that the desired spacing between a left hand supplemental support and a right hand supplemental support is achieved. Typically, the spacing between the commonly provided two (2) female fasteners 134 (i.e., left and right ones) attached to and extending from left and right ones of supports 112 will be achieved. Known light fixtures, for example, are provided with respective left and right male fasteners 134 (and 70), about 3.5 inches (3.5 in.) on center, which will be mated with such left and right female fasteners during final use of the illustrated junction boxes.

Preferably, a lock nut 120 cooperates in the attachment of stud 112 to dimple 24. Good results have been achieved when lock nut 120 was pressure fit into the stud 112 that had been drawn through the corresponding aperture in dimple 24. Lock nut 120 is pressure fit in the direction 124.

Lock nut 120 may be provided with female threads. In that case, box 110 may be assembled at the factory by attaching stud 112 to dimple 24 and lock nut 120. The user can then use illustrated fasteners 134 for attaching a ceiling fixture to box 110; i.e., to the female threads of lock nut 120.

Preferably, as in the other embodiments, a distance 138 between respective center lines 142 of fasteners 134 is set at a standard distance that corresponds to an industry standard for light fixtures, ceiling fans, and the like. Currently, a standard industry distance 138 is about 3.5 inches (3.5 in.).

All the advantages described regarding the stabilizing of supplemental supports of FIGS. 7 and 8 relative to the remainder of their respective junction boxes hold true for all the other preferred embodiments of the invention.

Good results have been achieved when extensions and/or knurling and/or roughened surfaces 150 are provided on an upper portion of support 112. When 150 is in the form of roughened surfaces, such roughened surfaces should be sufficiently roughened so as to engage one or both corresponding holes extending through top wall 14.

Figure 9:
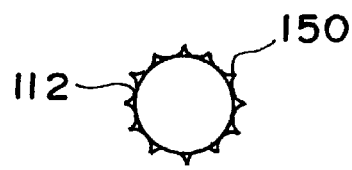
FIG. 9 is a cross-sectional view of a portion of the preferred embodiment of the junction box of FIG. 8.

FIG. 9 illustrates an exaggerated cross-sectional view of the extensions 150 of support 112.

As to supplemental supports, such as the illustrated supports 30, 60, 90 and 110, it is likewise contemplated that such supplemental supports will have fully round cylindrical shapes, hexagonal-shapes, square shapes, shapes which are tapered at an upper portion thereof (i.e., shapes that have the appearance of truncated cones, and truncated pyramids). In addition, frustrums of pyramids and the other shapes are contemplated with truncation taken at angles other than the illustrated substantially 90° angle between the top face of respective supplemental supports 30, 60, 90 and 110 that contacts the lower face 44 of upper wall 14 of the various preferred embodiments of the junction box according to the invention.

It is expected that locking coupling nuts will be used to attach supplemental supports to variations of the illustrated embodiments to the junction box, as in the FIG. 8 embodiment, as well as any other means of fastening supplemental supports to the junction box in a sufficiently secure manner so as to achieve the objects of the invention.

The term "fasteners" is intended to include all types of screws, bolts, and rivets, as well as the gripping extensions 150 of FIG. 9, for example.

It will be appreciated that these are merely examples of solutions to the problems set forth in my accompanying drawings and description, and, taken in its entirety, it will be appreciated that all the above objects of the invention, as well as many others, have been fulfilled.

It will likewise be appreciated that all the components described in the foregoing can be made of a variety of materials, such as steel, zinc, nylon, and other plastics, as the producer and user demand.

While this invention has been described as having a preferred design, it is understood that it is capable of further modification, uses and/or adaptations following in general the principle of the invention and including such departures from the present disclosures as come within known or customary practice in the art to which the invention pertains, and as may be applied to the essential features set forth, and fall within the scope of the invention or the limits of the appended claims.

I claim:

1. A mounting assembly, comprising:
    a) a box including a top wall and a side wall;
    b) said side wall extending downwardly away from said top wall and defining a cavity therein;
    c) a supplemental fixture support;
    d) said supplemental fixture support being disposed adjacent said side wall;
    e) a fastener being disposed adjacent said top wall and said fixture support for securing said fixture support to said top wall;
    f) a dimple being provided in said top wall; and
    g) a lower face of said dimple being configured for abutting a top portion of said supplemental fixture support when said fastener secures said supplemental fixture support to said top wall.

2. A device as defined in claim 1, wherein:
    a) said dimple is provided adjacent a radiused portion of said box; and
    b) said radiused portion is disposed adjacent said top wall and said side wall.

3. A device as defined in claim 1, wherein:
    a) said supplemental fixture support engages said side wall when said fastener secures said supplemental fixture support to said top wall.

4. A device as defined in claim 1, wherein:
    a) said supplemental fixture support extends from said top wall of said box to a bottom portion thereof.

5. A device as defined in claim 1, wherein:
a) a threaded hole is provided on said supplemental fixture support.
6. A device as defined in claim 1, wherein:
a) said fastener includes a screw.
7. A device as defined in claim 1, wherein:
a) said fastener includes a bolt.
8. A device as defined in claim 7, wherein:
a) said bolt has threads; and
b) said bolt and said supplemental fixture support are configured so that none of said threads are exposed within said cavity.
9. A device as defined in claim 1, wherein:
a) said supplemental fixture support has an exposed surface which is sufficiently smooth for avoiding wear to plastic-coated electrical wire which engages said exposed surf ace when said box is in use.
10. A device as defined in claim 1, wherein:
a) a top threaded hole is provided on said top portion of said supplemental fixture support; and
b) a bottom threaded hole is provided on a bottom portion of said supplemental fixture support.
11. A device as defined in claim 10, wherein:
a) said top threaded hole includes a partially threaded hole.
12. A device as defined in claim 1, wherein:
a) said fixture support has an upper portion and a lower portion having a volume less than said upper portion.
13. A device as defined in claim 1, wherein:
a) said dimple is configured for moving a lower portion of said fixture support toward said side wall when said fastener secures said fixture support to said top wall.
14. A device as defined in claim 1, wherein:
a) said supplemental fixture support has a substantially flat face, and said substantially flat face engages said side wall.
15. A device as defined in claim 1, wherein:
a) said fastener includes a lock nut.
16. A device as defined in claim 1, wherein:
a) said supplemental fixture support is configured for engaging said top wall for restricting rotational movement of said supplemental fixture support relative to said top wall.
17. A mounting assembly, comprising:
a) a box including a top wall and a side wall;
b) said side wall extending downwardly away from said top wall and defining a cavity therein;
c) a supplemental fixture support;
d) said supplemental fixture support being disposed adjacent said side wall;
e) a fastener being disposed adjacent said top wall and said fixture support for securing said fixture support to said top wall;
f) a dimple being provided in said top wall; and
g) said dimple being configured for engaging a top portion of said supplemental fixture support when said fastener secures said supplemental fixture support to said top wall.
18. A device as defined in claim 17, wherein:
a) said supplemental fixture support is configured for interengaging with said side wall a sufficient amount for restricting movement of said supplemental fixture support relative to said side wall in a first direction, while allowing movement of said supplemental support in a second direction transverse to said first direction.
19. A device as defined in claim 17, wherein:
a) said first direction includes movement transverse to a plane extending along said side wall; and
b) said second direction includes movement along the axis of elongation of said fastener.
20. A device as defined in claim 17, wherein:
a) said first direction includes rotational movement around the axis of elongation of said fastener; and
b) said second direction includes movement along the axis of elongation of said fastener.
21. A device as defined in claim 18, wherein:
a) said first direction includes movement transverse to a plane extending along said side wall; and
b) said second direction includes movement along the plane extending along said side wall.
22. A device as defined in claim 17, wherein:
a) said supplemental fixture support has a substantially flat face, and said substantially flat face engages said side wall.
23. A device as defined in claim 17, wherein:
a) said supplemental fixture support engages said side wall when said fastener secures said supplemental fixture support to said top wall.
24. A device as defined in claim 17, wherein:
a) said supplemental fixture support extends from said top wall of said box to a bottom portion thereof.
25. A device as defined in claim 17, wherein:
a) said fastener includes a lock nut.
26. A device as defined in claim 17, wherein:
a) said supplemental fixture support has knurling on an outer surface thereof.
27. A device as defined in claim 17, wherein:
a) said supplemental fixture support is configured for engaging said top wall for restricting rotational movement of said supplemental fixture support relative to said top wall.
28. A device as defined in claim 17, wherein:
a) said fixture support extends into said cavity.
29. A mounting assembly, comprising:
a) a box including a top wall and a side wall;
b) said side wall extending downwardly away from said top wall and defining a cavity therein;
c) a supplemental fixture support;
d) a fastener being disposed substantially adjacent said top wall and said fixture support for securing said fixture support to said top wall;
e) a dimple being provided in said top wall; and
f) said dimple being configured for engaging said supplemental fixture support when said fastener secures said supplemental fixture support to said top wall.
30. A device as claimed in claim 29, wherein:
a) an adhesive is disposed on said top wall.
31. A device as defined in claim 29, wherein:
a) a piece of double-sided tape is disposed on said top wall.
32. A device as defined in claim 30, wherein:
a) said adhesive includes a spray-on adhesive.
33. A device as defined in claim 29, wherein:
a) at least a second supplemental fixture support is provided spaced apart from said supplemental fixture support.

34. A device as defined in claim 29, wherein:
a) a threaded hole is provided at a lower portion of said supplemental fixture support; and
b) said threaded hole is sized for receiving a ceiling fan support fastener.

35. A device as defined in claim 29, wherein:
a) a threaded hole is provided at a lower portion of said supplemental fixture support; and
b) said threaded hole is sized for receiving a light fixture support fastener.

36. A device as defined in claim 29, wherein:
a) a threaded hole is provided at a lower portion of said supplemental fixture support; and
b) said threaded hole is sized for receiving a ceiling fan fastener or a light fixture support fastener.

37. A device as defined in claim 33, wherein:
a) a threaded hole is provided on a lower portion of each one of said supplemental fixture support and said at least a second supplemental fixture support;
b) each said threaded hole is sized for receiving at least one of a threaded ceiling fan support fastener and a threaded light fixture support fastener; and
c) each of said supplemental fixture support and said at least a second supplemental fixture support is configured so that none of the respective threads of said at least one threaded ceiling fan support fastener and said threaded light fixture support fastener are exposed within said cavity when received in a respective one of each said threaded hole.

38. A device as defined in claim 29, wherein:
a) a threaded hole is provided on a lower portion of said supplemental fixture support; and
b) said threaded hole is sized for receiving said fastener having threads thereon; and
c) said supplemental fixture support is configured so that substantially none of the threads of said fastener are exposed within said cavity.

39. A device as defined in claim 38, wherein:
a) said supplemental fixture support is configured so that none of the threads of said fastener are exposed within said cavity.

* * * * *